US007261364B2

(12) United States Patent
Tanigawa

(10) Patent No.: US 7,261,364 B2
(45) Date of Patent: Aug. 28, 2007

(54) SLIDING DOOR APPARATUS FOR VEHICLE

(75) Inventor: Masahiro Tanigawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 11/214,340

(22) Filed: Aug. 29, 2005

(65) Prior Publication Data
US 2006/0043766 A1  Mar. 2, 2006

(30) Foreign Application Priority Data
Aug. 30, 2004  (JP) ............... 2004-250218

(51) Int. Cl.
B60J 5/05 (2006.01)
(52) U.S. Cl. ................................ 296/155
(58) Field of Classification Search ................ 296/155
See application file for complete search history.

(56) References Cited
FOREIGN PATENT DOCUMENTS

| JP | U-5-80840 | 11/1993 |
| JP | 2003-146080 | 5/2003 |
| JP | 2003-154851 | * 5/2003 |

* cited by examiner

Primary Examiner—Dennis H. Pedder
(74) Attorney, Agent, or Firm—Carrier, Blackman & Associates P.C.; William D. Blackman; Joseph P. Carrier

(57) ABSTRACT

A sliding door apparatus for a vehicle includes a sliding door, a recessed part formed on a side of a vehicle body of the vehicle and extending in a front-and-rear direction of the vehicle body, and a guide rail attached to the recessed part for guiding the sliding door. The guide rail extends in the front-and-rear direction of the vehicle body. The apparatus includes a cover supporting member attached directly to the side of the vehicle body and extending continuously along the rail within the recessed part, and a cover covering the guide rail and the cover supporting member. The apparatus includes first and second positioning parts formed integrally with the cover supporting member for positioning the cover relative to the cover supporting member.

19 Claims, 11 Drawing Sheets

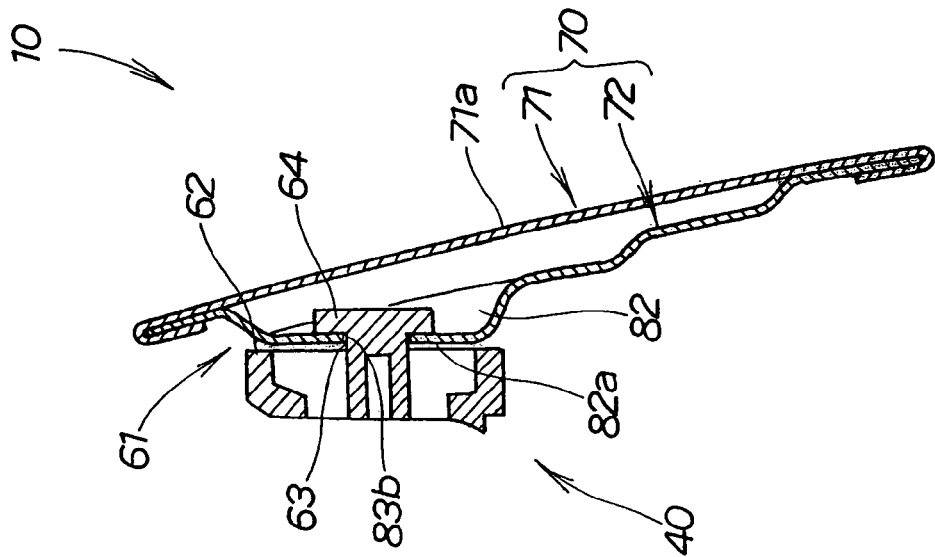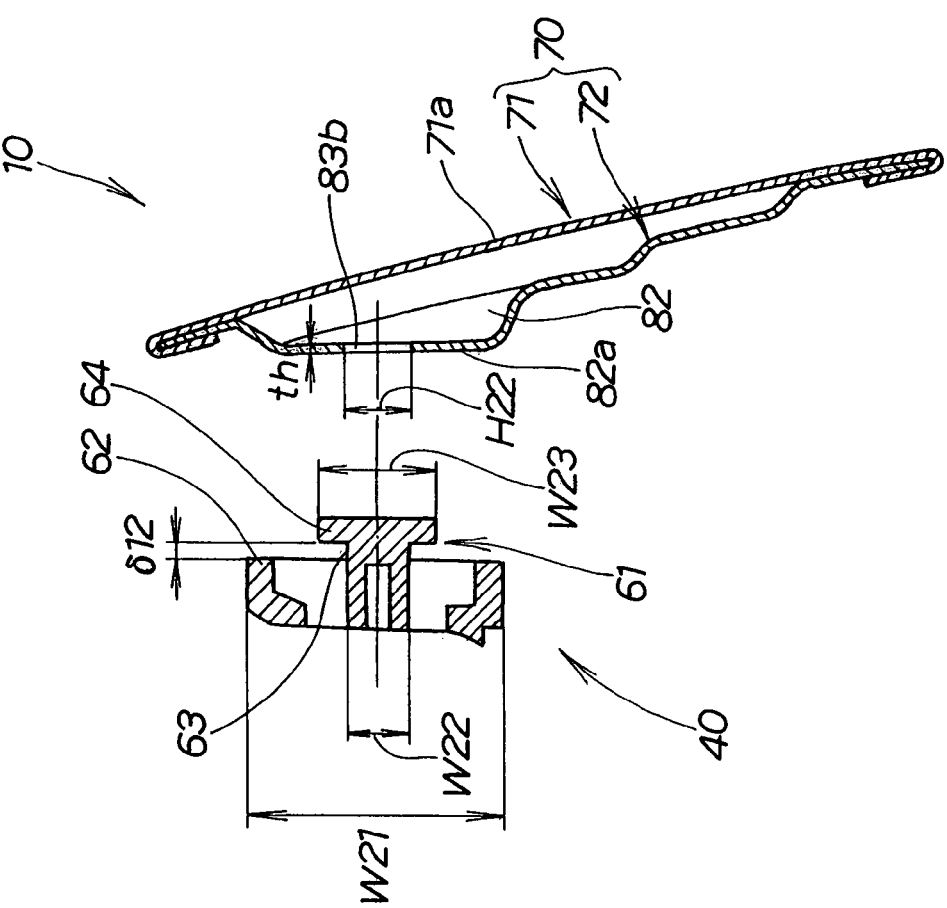

SLIDING DOOR APPARATUS FOR VEHICLE

CROSS-REFERENCE TO RELATED APPLICATIONS

The present invention claims priority under 35 USC 119 based on Japanese patent application No. 2004-250218, filed Aug. 30, 2004.

FIELD OF THE INVENTION

The present invention relates to a vehicular sliding door apparatus including a sliding door, a guide rail provided on a side of a vehicle body for guiding the sliding door in a front-and-rear direction of the vehicle body between an opened position and a closed position, and a cover disposed outside the guide rail for covering the guide rail.

BACKGROUND OF THE INVENTION

Vehicles such as automobiles include sliding doors provided on sides of vehicle bodies thereof and movable in a front-and-rear direction of the vehicle bodies between opened positions and closed positions. The sliding doors are guided by rails provided on outer surfaces of the vehicle bodies to move between the opened positions and the closed positions. In recent years, technologies are developed to provide the vehicles with covers for covering the rails to improve outer appearances of the vehicles, as disclosed in JP-A-2002-12034.

A conventional vehicular sliding door apparatus disclosed in JP-A-2002-12034 will be explained with reference to FIG. 11A and FIG. 11B hereof. FIG. 11A is an exploded perspective view of the apparatus. FIG. 11B is a cross-sectional view taken along line b-b of FIG. 11A.

The sliding door apparatus, designated at 100, includes a recessed part 102 formed on a side of a vehicle body 101 and extending in a front-and-rear direction of the vehicle body 101, a guide rail 103 attached to the recessed part 102 and extending in the front-and-rear direction of the vehicle body 101, and a cover 104 covering an outer side of the rail 103.

The rail 103 guides a sliding door 106 in the front-and-rear direction of the vehicle body 101 through a door bracket 105. The cover 104 has a front end portion attached to a front bracket 107 of the rail 103 by a clip 108. The cover 104 has a rear end portion attached to the vehicle body 101 by screws 109, 109.

Plural intermediate brackets 111 are attached to an upper end surface of the rail 103 and arranged longitudinally of the rail 103. The brackets 111 act as cover supporting members each having a generally inverted L configuration. The rail 103 and the intermediate bracket 111 jointly define a cylindrical space 112 (FIG. 11B) therebetween. Plural attachment fittings 113 are attached to an inner surface of the cover 104 and arranged longitudinally of the cover 104.

The respective attachment fittings 113 are attached to respective retainers 114. Each retainer 114 is then mounted in the cylindrical space 112 by being inserted from a rear side of the space 112 into the cylindrical space 112 between the rail 103 and the intermediate bracket 111. Through the attachment fittings 113, the retainers 114, the rail 103 and the intermediate brackets 111 thus arranged, the cover 104 can be attached to the vehicle body 101.

For improving an outer appearance of a vehicle, it is preferable that the cover 104 have an outer surface 104 in flush with a side surface 101a of the vehicle body 101.

Since the cover 104 is attached via the intermediate brackets 111 and the rail 103 to the recessed part 102 of the vehicle body 101, a position of the cover 104 is affected by how accurately the rail 103 is attached to the vehicle body 101.

Further, since the intermediate brackets 111 are attached to the rail 103 with less uniform accuracy, the position of the cover 104 is also affected by how accurately each intermediate bracket 111 is attached to the rail 103.

Thus, improvement is required for attaching the cover 104 through the intermediate brackets and the rail to the recessed part of the vehicle body with improved accuracy.

SUMMARY OF THE INVENTION

An object of the present invention is to attach a cover to a vehicle body with improved accuracy for improving an outer appearance of a vehicle.

According to one aspect of the present invention, there is provided a sliding door apparatus for a vehicle, comprising: a sliding door; a recessed part formed on a side of a vehicle body of the vehicle and extending in a front-and-rear direction of the vehicle body; a guide rail attached to the recessed part for guiding the sliding door, the guide rail extending in the front-and-rear direction of the vehicle body; a cover supporting member attached directly to the side of the vehicle body and extending continuously along the guide rail within the recessed part; a cover covering the guide rail and the cover supporting member; and at least one positioning part formed integrally with the cover supporting member for positioning the cover relative to the cover supporting member.

The cover supporting member is provided separately from the rail and is attached directly to the side of the vehicle body. The cover supporting member is attached to the vehicle body with accuracy unaffected by how accurately the guide rail is attached to the recessed part. Since the positioning part formed integrally with the cover supporting member positions the cover, a position of the cover relative to the vehicle body can be accurately set.

Since the cover supporting member extends continuously along the rail, the cover can be positioned relative to the cover supporting member with substantially uniform accuracy along the length of the cover.

Thus, the cover can be positioned relative to the vehicle body with improved accuracy. The improvement in the accuracy enables an outer surface of the cover to be readily in flush with a side surface of the vehicle body. Thus, a vehicle can provide an improved outer appearance.

Preferably, plural positioning parts are provided along a length of the cover supporting member.

The positioning parts can more accurately position the cover than a single positioning part extending continuously along the length of the cover supporting member. The positioning parts are formed integrally with the cover supporting member with substantially uniform accuracy.

Desirably, the positioning part has engaging means for engaging the cover.

By the engagement with the engaging means, the cover can be more accurately positioned relative to the cover supporting member as well as being more firmly attached to the cover supporting member.

Preferably, the cover has at least one portion attached directly to the side of the vehicle body.

Thus, the cover can be attached to the vehicle body with improved accuracy.

Desirably, the positioning part has a vertical positioning portion for positioning longitudinally opposite ends of the cover in such a manner as to prevent a vertical movement of the cover.

Therefore, the longitudinally opposite ends of the cover can be more accurately positioned relative to the cover supporting member to prevent any vertical movement of the cover.

Preferably, the positioning part has a transverse positioning portion for positioning the cover in such a manner as to prevent the cover from moving transversely of the vehicle body.

By virtue of the transverse positioning portion, the cover can be more accurately positioned relative to the cover supporting member without moving transversely of the vehicle body. Thus, the position of the cover relative to the vehicle body can be more accurately set.

BRIEF DESCRIPTION OF THE DRAWINGS

A certain preferred embodiment of the present invention will hereinafter be described in detail, by way of example only, with reference to the accompanying drawings, in which:

FIG. 10A is a cross-sectional view of a second positioning part and the cover separated from each other and FIG. 10B is a cross-sectional view of the second positioning part and the cover combined together.

DETAILED DESCRIPTION OF THE PREFERRED EMBODIMENTS

Figure 1:
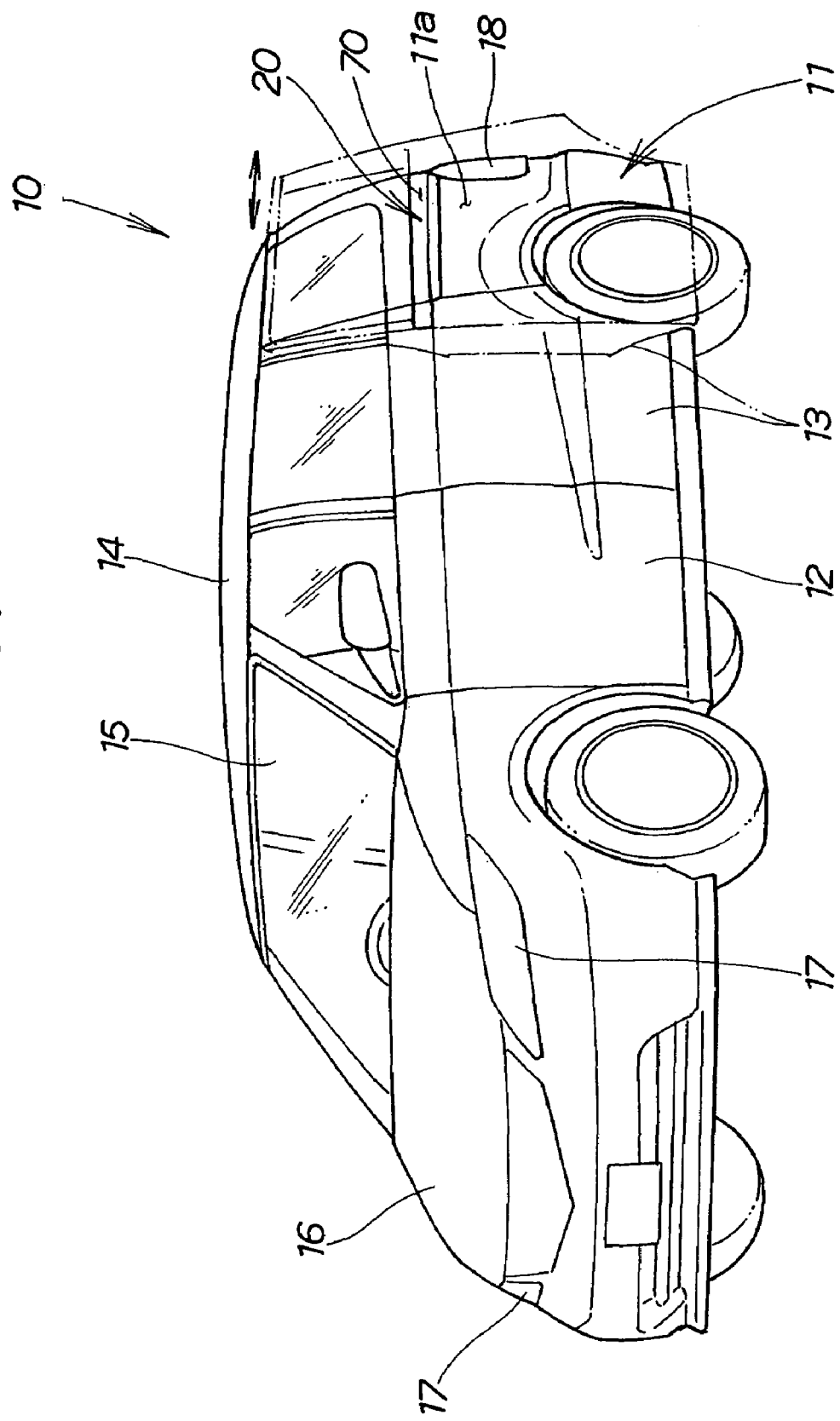
FIG. 1 is a perspective view of a vehicle as viewed from a front left side of the vehicle.

Referring to FIG. 1, a vehicle 10 is an automobile including a vehicle body 11 equipped with right and left front doors (only left one shown) 12 and right and left rear doors (only left one shown) 13. Each of the rear doors provided on sides of the vehicle body 11 is sidable in a front-and-rear direction of the vehicle body 11 between an opened position (shown by a phantom line) and a closed position (shown by a solid line). The rear door 13 will be hereinafter referred to as "sliding door 13".

Reference numerals 14, 15, 16, 17, 18 denote a roof, a windshield, a hood, a headlamp and a tail lamp, respectively.

Figure 2:
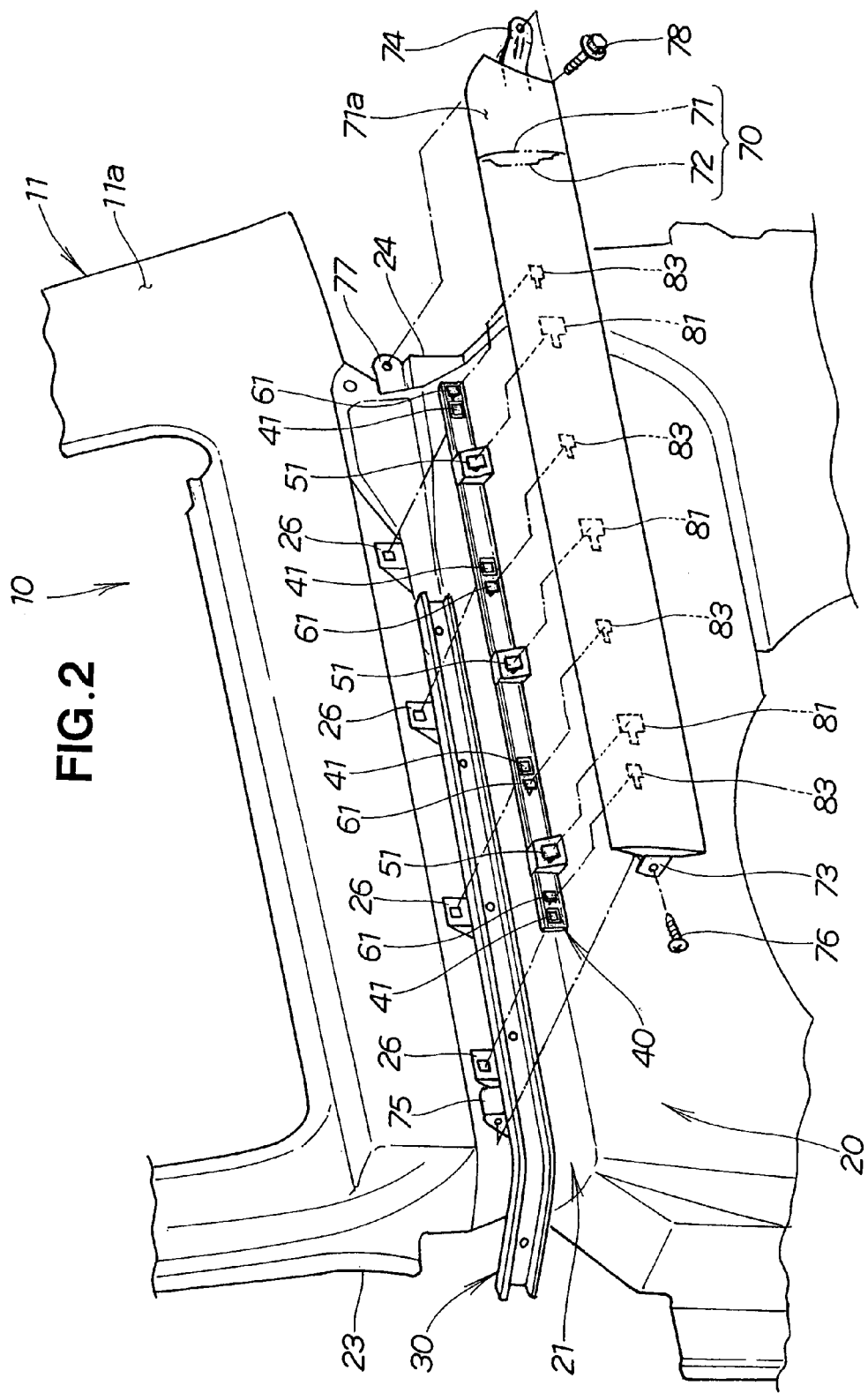
FIG. 2 is an exploded view showing a sliding door apparatus for a vehicle according to the present invention, the apparatus being disassembled to provide a guide rail, a cover supporting member and a cover.
Figure 3:
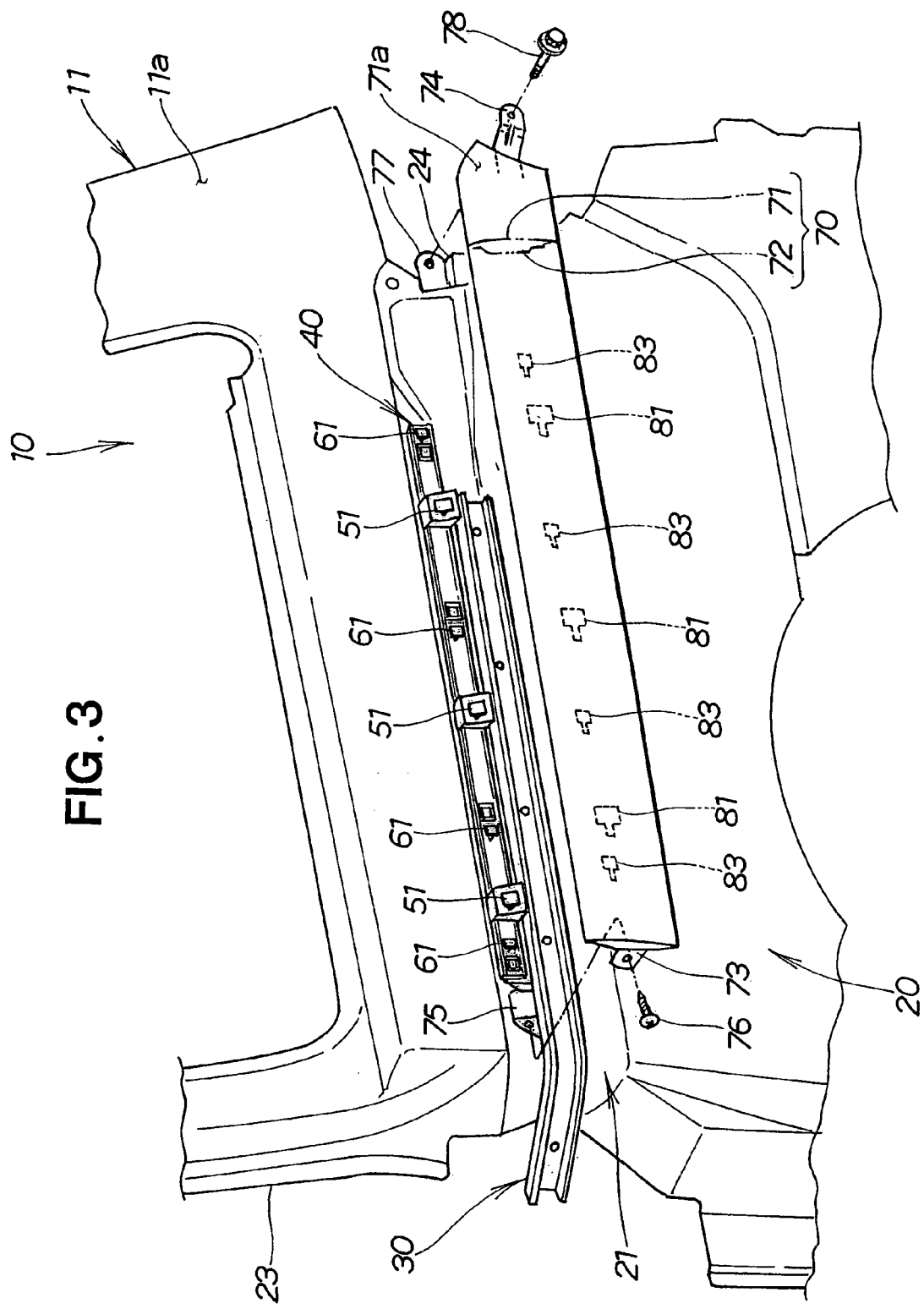
FIG. 3 is a view showing the sliding door apparatus of FIG. 2 with the cover detached from the cover supporting member.

As shown in FIG. 2 and FIG. 3, a sliding door apparatus 20 for the vehicle 10 includes the sliding door 13, a recessed part 21 formed on the side of the vehicle body 11 and elongated in a front-and-rear direction of the vehicle body 11, a guide rail 30 attached to the recessed part 21 for guiding the sliding door 13, a cover supporting member 40 attached to the recessed part 21, and a cover 70 covering an outer side of each of the guide rail 30 and the cover supporting member 40.

Figure 4:
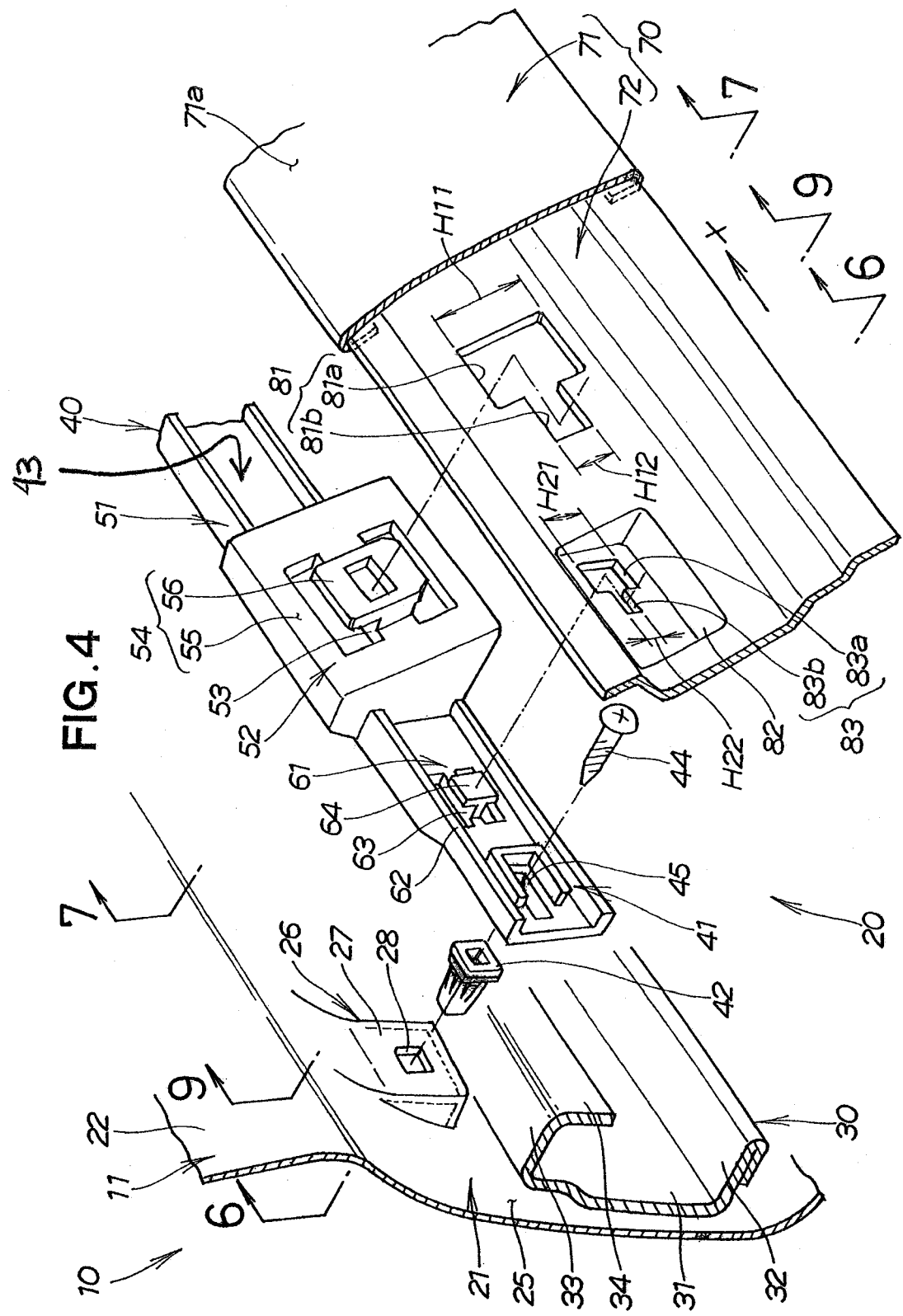
FIG. 4 is an exploded view corresponding to a portion of FIG. 2, showing on enlarged scale the guide rail, the cover supporting member and the cover.

As shown in FIG. 2 and FIG. 4, the recessed part 21 is formed on a vehicle body panel 22 disposed on the side of the vehicle body 11 and is opened transversely outwardly of the vehicle body 11. The vehicle body panel 22 is made of a steel plate. The recessed part 21 is an elongated groove horizontally extending between an edge 23 of a sliding door opening and a tail lamp attachment portion 24 to which the tail lamp 18 is attached.

The recessed part 21 includes a plurality of attachment portions 26 formed on a bottom surface 25 of the recessed part 21 for attachment of the cover supporting member 40 to the attachment portions 26. The attachment portions 26 are located above the guide rail 30 (hereinafter referred to as "rail 30"). The attachment portions 26 are spaced at constant pitches along the rail 30. More specifically, as shown in FIG. 4, the attachment portion 26 projects from the bottom surface 25 of the recessed part 21 outwardly, i.e., towards an opened side of the recessed part 21. The attachment portion 26 has a flat, generally vertical surface 27 disposed at a distal end thereof This flat, generally vertical surface 27 is hereinafter referred to as "attachment surface 27". The attachment surface 27 has an attachment hole 28 formed therethrough.

The rail 30 is elongated in the front-and-rear direction of the vehicle body 11. The rail 30 is a horizontally oriented member having a generally L-shaped configuration as viewed in top plan. The rail 30 is attached to the bottom surface 25 by a bolt and the like.

The rail 30 has a generally C-shaped cross-section. The rail 30 includes a web 31 taking the form of a vertically disposed plate and attached to the bottom surface 25 of the recessed part 21, a lower flange 32 extending from a bottom edge of the web 31 towards the opened side of the recessed part 21, an upper flange 33 extending from a top edge of the web 31 towards the opened side of the recessed part 21, and a vertically downwardly extending portion 34 extending vertically downwardly from a distal edge of the upper flange 33. The rail 30 is a single member made of steel material.

As shown in FIGS. 3 and 4, the cover supporting member 40 is disposed above and continuously extends along the rail 30. The cover supporting member 40 is horizontally elongated in the front-and-rear direction of the vehicle body 11. The cover supporting member 40 is a single member made of resin material.

Figure 5:
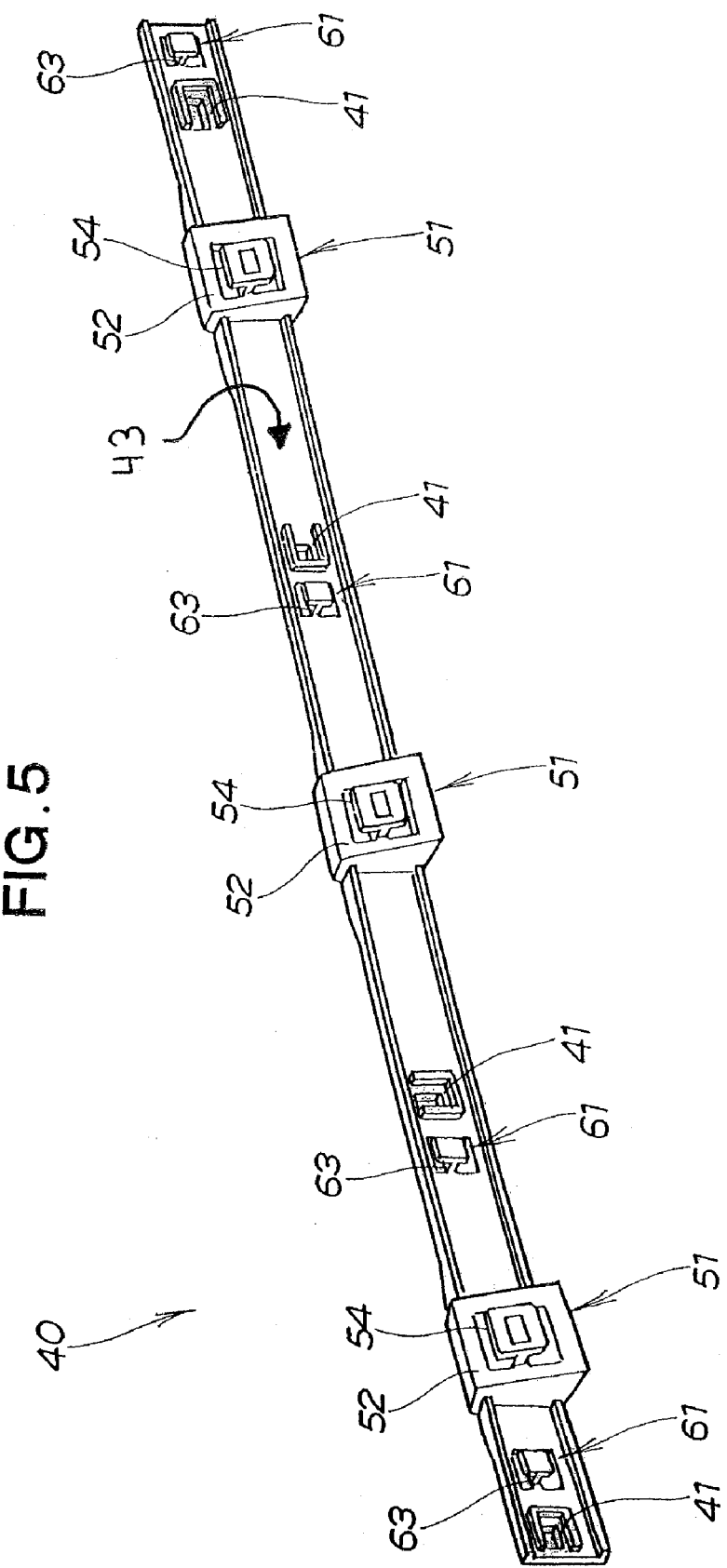
FIG. 5 is a perspective view of a cover supporting member of the apparatus.

As shown in FIG. 4 and FIG. 5, the cover-supporting member 40 includes plural attachment parts 41 to be attached to the attachment portions 26 of the recessed part 21, an elongated base strip portion 43, plural first positioning parts 51 and plural second positioning parts 61. The attachment parts 41, the first positioning parts 51 and the second positioning parts 61 are all formed integrally with and interconnected by the base strip portion 43 of the cover-supporting member 40.

The attachment parts 41, the first positioning parts 51 and the second positioning parts 61 are arranged along a length of the cover-supporting member 40. In the example illustrated in FIG. 5, the cover-supporting member 40 includes the attachment part 41, the second positioning part 61, the first positioning part 51, the second positioning part 61, the attachment part 41, the first positioning part 51, the second positioning part 61, the attachment part 41, the first positioning part 51, the attachment part 41 and the second positioning part 61 which are arranged along the base strip portion 43 in the named order from a front side to a rear side of the vehicle body 11. The attachment parts 41 are disposed at front and rear end portions of the cover-supporting member 40, respectively. The respective attachment parts 41 are to be attached to the corresponding attachment portions 26, as shown in FIG. 2.

As shown in FIGS. 2 and 4, the cover 70 is horizontally disposed and is elongated in the front-and-rear direction of the vehicle body 11. The cover 70 includes a transversely outer panel 71, a transversely inner panel 72, and front and rear stays 73, 74. The outer panel 71, the inner panel 72 and the stays 73, 74 are made by subjecting steel plates to press forming.

The cover 70 has at least one portion attached directly to the side of the vehicle body 11. More specifically, the inner panel 72 includes the front and rear stays 73, 74 extending towards the recessed part 21 from front and rear end portions of the cover 70, respectively. The front end portion of the cover 70 is attached through the rail 30 to the vehicle body 11 with the front stay 73 attached, by a fastening member 76 such as a tapping screw, to a bracket 75 of the rail 30. The rear end portion of the cover 70 is attached directly to the vehicle body 11 with the rear stay 74 attached, by a fastening member 78 such as a bolt, to a bracket 77 formed at a rear end of the recessed part 21.

The inner panel 72 has plural first engaging holes 81, plural projecting portions 82 (FIG. 4), and plural second engaging holes 83 (FIG. 2 and FIG. 3).

The first engaging holes 81 are formed through portions of the inner panel 72 which correspond to the first positioning parts 51. As shown in FIG. 4, the first engaging hole 81 is a horizontal T-shaped through-hole constituted by a first insertion hole 81a of enlarged width and a first engagement hole 81b of reduced width. The first engagement hole 81b is located at a lateral side of and communicates with the first insertion hole 81a. The first insertion hole 81a has the width H11. The first engagement hole 81b has the width H12.

The projecting portions 82 are formed at portions of the inner panel 72 which correspond to the second positioning parts 61. The projecting portions 82 have the second engaging holes 83 formed through portions thereof corresponding to the second positioning parts 61. The second engaging hole 83 is a horizontal T-shaped through-hole constituted by a second insertion hole 83a of enlarged width and a second engagement hole 83b of reduced width. The second engagement hole 83b is located at a lateral side of and communicates with the second insertion hole 83a. The second insertion hole 83a has the width H21. The second engagement hole 83b has the width H22.

Figure 6:
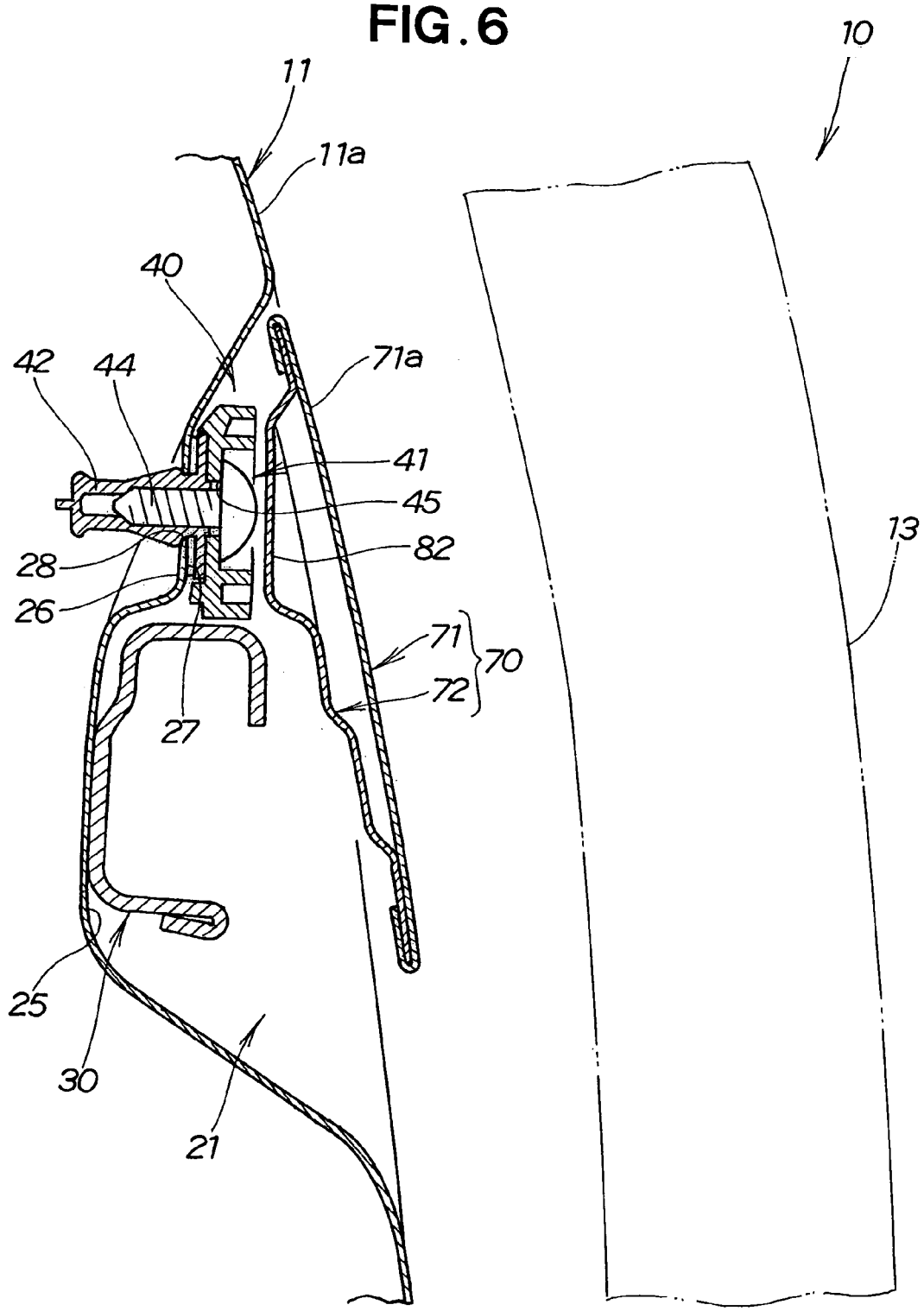
FIG. 6 is a cross-sectional view taken along line 6-6 of FIG. 4.

As shown in FIG. 4 and FIG. 6, for attachment of the attachment part 41 to the attachment portion 26, a clip 42 is fitted to a through-hole 45 of the attachment part 41 and then a tapping screw 44 is screwed through the through-hole 45 into the clip 42. The attachment part 41 with the clip 42 fitted to the through-hole 45 and with the tapping screw 44 screwed into the clip 42 is brought close to the attachment surface 27 from the transversely outside of the vehicle body 11 to bring the clip 42 into resilient fitting engagement (snap-fit engagement) with the attachment hole 28 for attaching the attachment part 41 to the attachment portion 26 of the recessed part 21. Therefore, the cover supporting member 40 is attached directly to the side of the vehicle body 11, that is, to the recessed part 21 formed on the side of the vehicle body 11.

Figure 7:
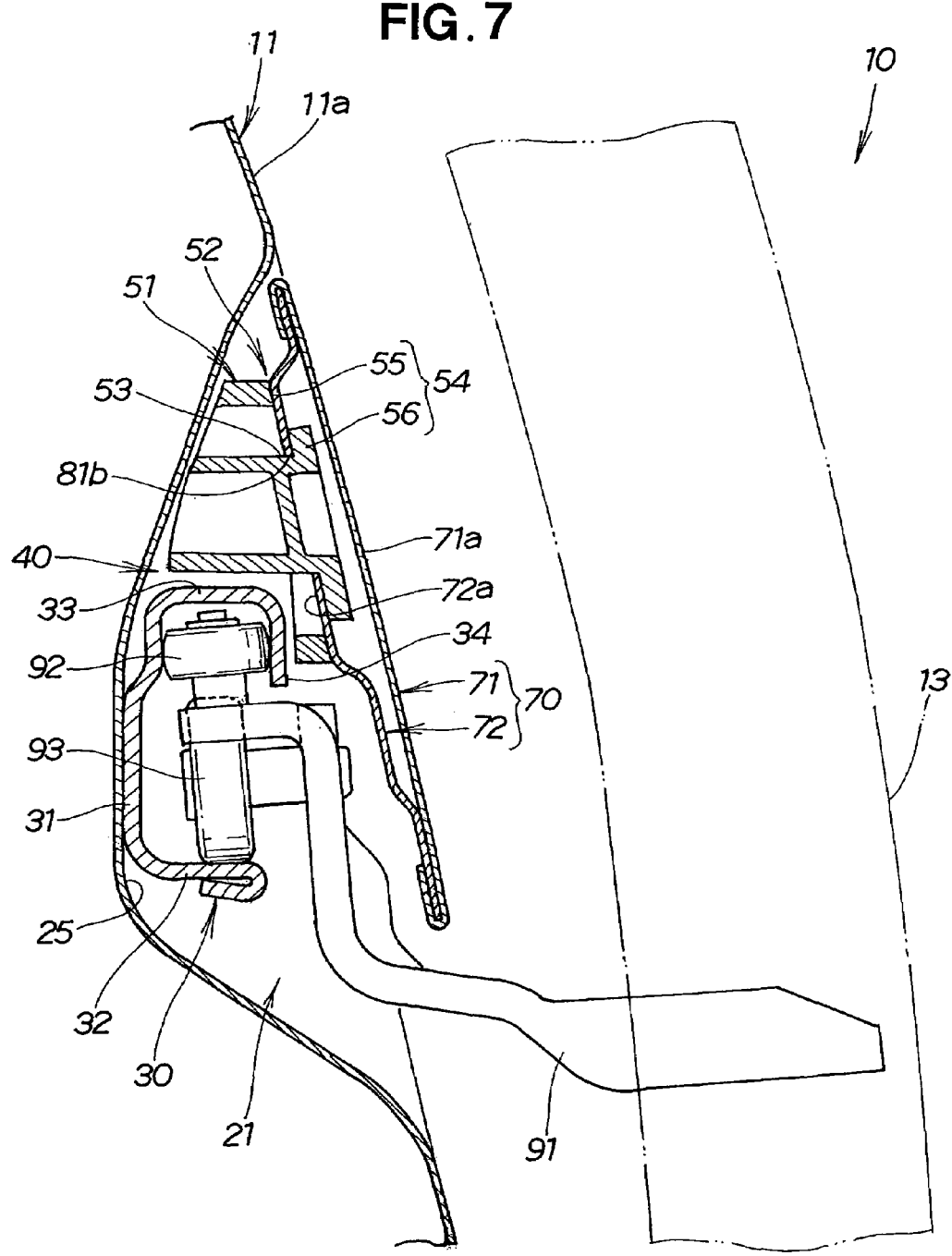
FIG. 7 is a cross-sectional view taken along line 7-7 of FIG. 4.

FIG. 7 shows in cross-section the first positioning part 51 and its surroundings. As shown in FIG. 7, the cover 70 is disposed in the opening formed in the recessed part 21 and in flush with the side of the vehicle body 11. The cover 70 covers the outer side of each of the rail 30 and the cover supporting member 40 with a lower portion of the recessed part 21 exposed to the outside of the vehicle body 11.

The sliding door 13 is equipped with a bracket 91 extending towards the recessed part 21. The bracket 91 has a distal end to which rollers 92, 93 are rotatably attached. The rail 30 rotatably supports the rollers 92, 93 to allow the sliding door 13 to slide along the rail 30 in the front-and-rear direction of the vehicle body 11. The bracket 91 passes into the opening of the recessed part 21 through a gap between the lower portion of the recessed part 21 and a lower end of the cover 70.

Figure 8B:
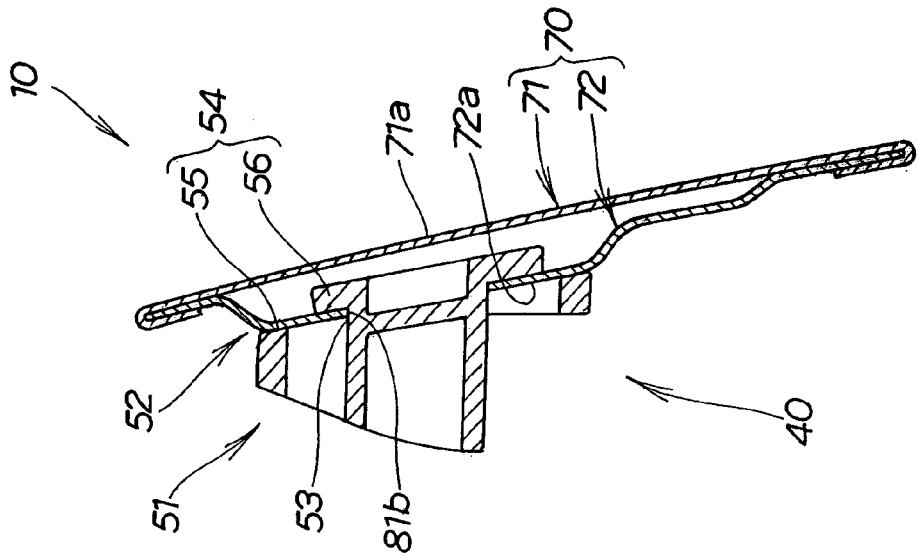
FIG. 8A is a cross-sectional view of a first positioning part and the cover separated from each other and FIG. 8B is a cross-sectional view of the first positioning part and the cover combined together.
Figure 8A:
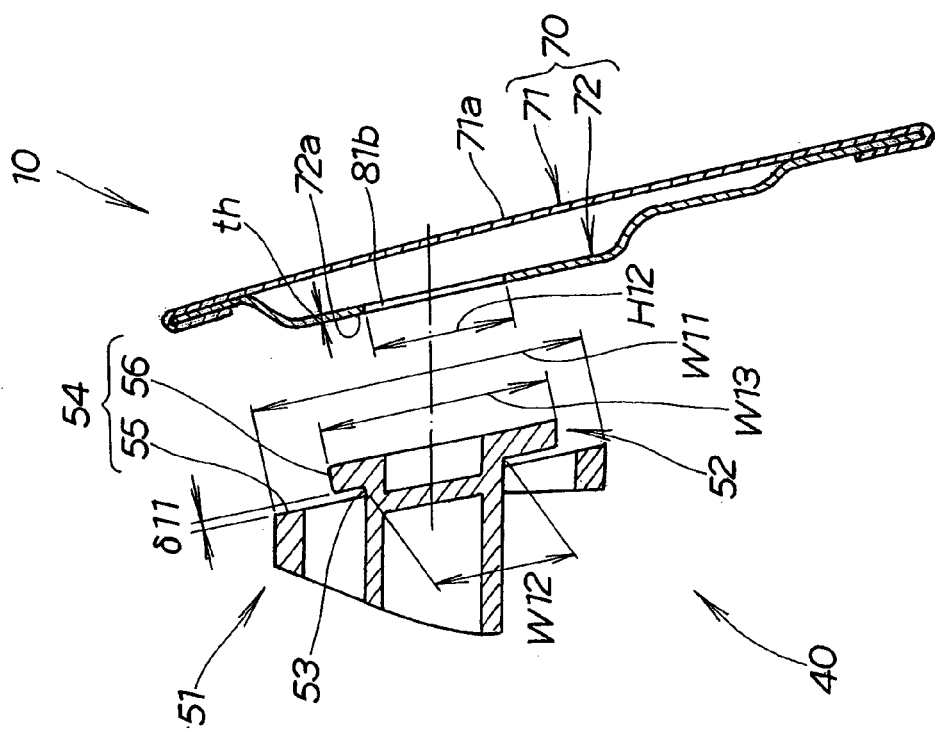

As shown in FIG. 4 and FIG. 8A, the first positioning part 51 projects from the cover supporting member 40 in the transversely outward direction of the vehicle body 11 and includes engaging part (means) 52 having a vertical positioning portion 53 and a transverse positioning portion 54.

As shown in FIG. 8A, the first positioning part 51 has a flat surface 55 at a distal end thereof. This flat surface 55 is hereinafter referred to as "abutting surface 55" or "first abutting surface". The vertical positioning portion 53 is of quadrangular configuration and projects from a center of the abutting surface 55 in the transversely outward direction of the vehicle body 11. The vertical positioning portion 53 has an engaging flange 56 formed at a distal end thereof. The vertical positioning portion 53 and the engaging flange 56 cooperate to define an outwardly extending tab portion of the first positioning part 51.

The engaging flange 56 has an inner surface spaced an interval δ 11 away from the abutting surface 55 in the transverse outward direction of the vehicle body 11. The interval δ 11 is slightly larger than a thickness th of the inner panel 72. The abutting surface 55 has a width W11. The vertical positioning portion 53 has a width W12 slightly larger than the width H12 of the first engagement hole 81b. The engaging flange 56 has a width W13 larger than the width W12 of the vertical positioning portion 53 and smaller than the width H11 (FIG. 4) of the first insertion hole 81a. The engaging flange 56 has a dimension set such that the engaging flange 56 can pass through the first insertion hole 81a.

The inner panel 72 has a flat inner surface 72a (that is, the cover 70 has a flat inner surface 72a, which may be referred to as a first flat inner surface).

After the engaging flange 56 passes through the first insertion hole 81a, the cover 70 is moved in a direction shown by an arrow X, as shown in FIG. 4, thereby allowing the vertical positioning portion 53 to engage the first engagement hole 81b, as shown in FIG. 7 and FIG. 8B.

By the engagement between the vertical positioning portion 53 and the first engagement hole 81b, the cover 70 is positioned relative to the cover supporting member 40 without undergoing any vertical movement. Thus, without moving vertically, the cover 70 is positioned relative to the vehicle body 11 to which the cover supporting member 40 is secured. The vertical positioning portion 53 serves to position the cover 70 in such a manner as to prevent any vertical movement of the cover 70.

The abutting surface 55 and the engaging flange 56 sandwich the inner panel 72 therebetween, as shown in FIG. 7 and FIG. 8B, for positioning the cover 70 relative to the cover supporting member 40 to prevent the cover 70 from moving transversely of the vehicle body 11. Thus, without moving transversely of the vehicle body 11, the cover 70 can be positioned relative to the vehicle body 11 to which the cover supporting member 40 is secured. The combination of the abutting surface 55 and the engaging flange 56 provides the transverse positioning portion 54 for positioning the cover 70 in such a manner as to prevent the cover 70 from moving transversely of the vehicle body 11.

Figure 9:
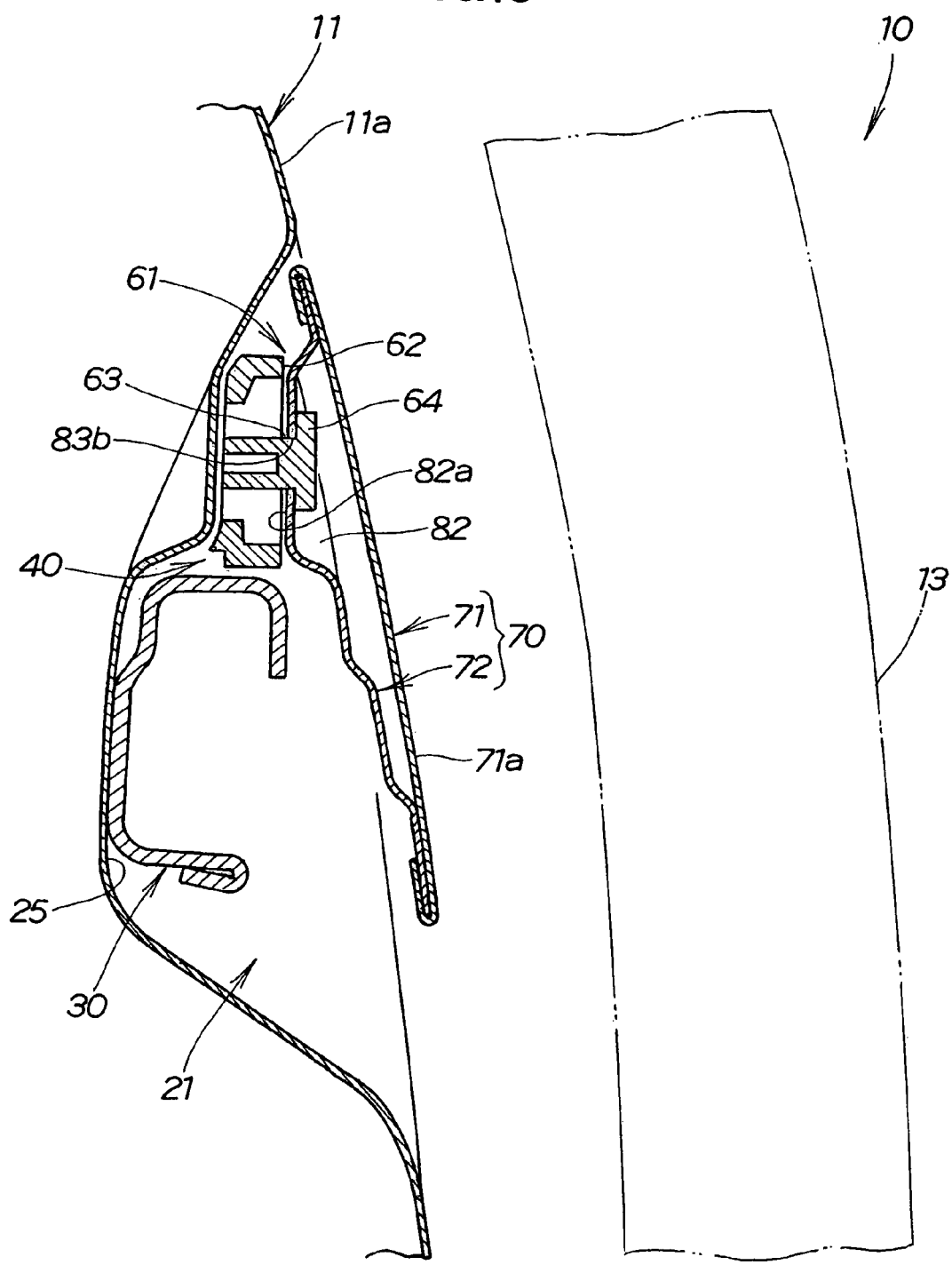
FIG. 9 is a cross-sectional view taken along line 9-9 of FIG. 4.
Figure 11A:
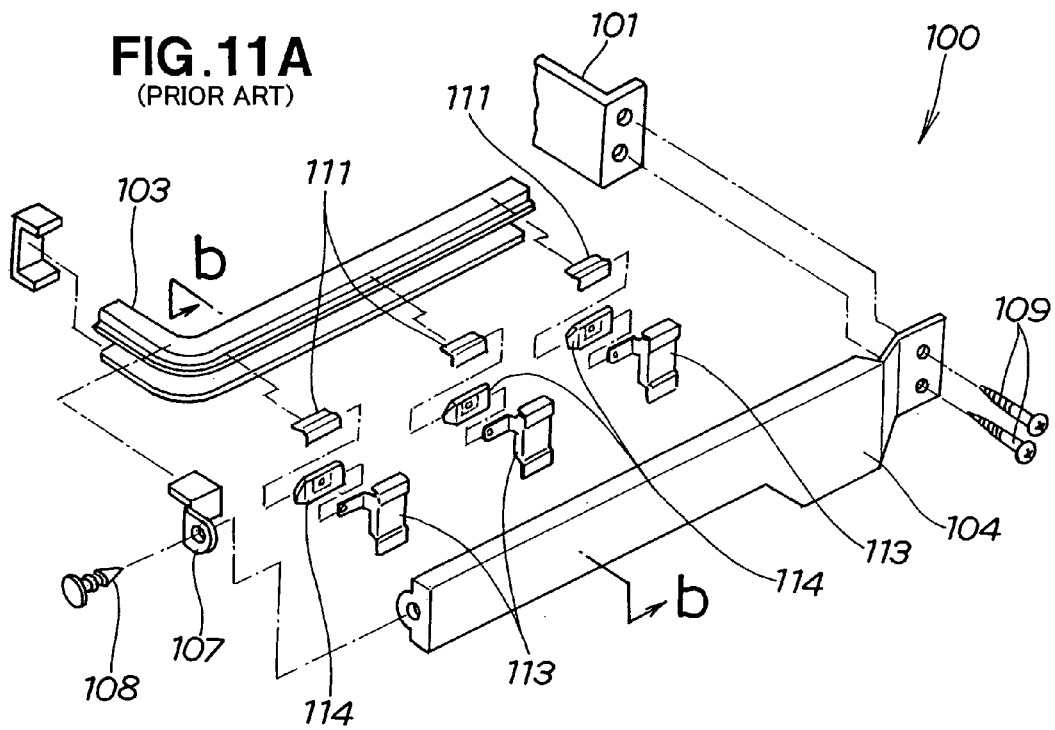
FIG. 11A is an exploded perspective view of a conventional sliding door apparatus for a vehicle and FIG. 11B is a cross-sectional view taken along line b-b of FIG. 11A.
Figure 11B:
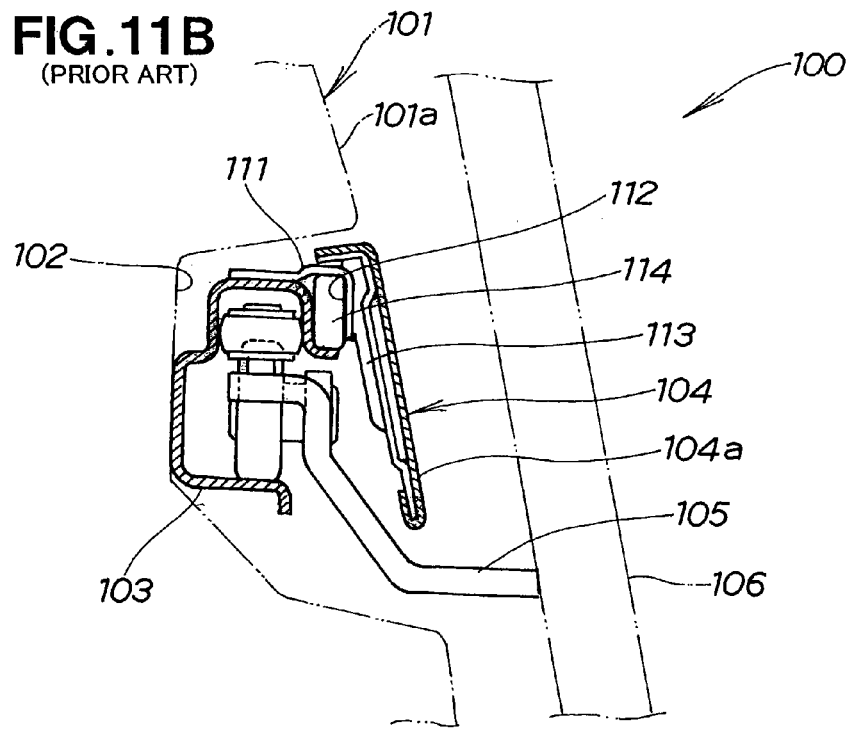

FIG. 9 shows in cross-section the second positioning part 61 and its surroundings.

As shown in FIG. 4 and FIG. 10A, the second positioning part 61 includes a vertical positioning portion 63 projecting from the cover supporting member 40 in the transversely outward direction of the vehicle body 11.

As shown in FIG. 10A, the second positioning part 61 has a flat surface (hereinafter referred to "abutting surface" or "second abutting surface") 62 facing transversely outwardly of the vehicle body 11. The vertical positioning portion 63 is of quadrangular configuration and projects from a center of the abutting surface 62 in the transversely outward direction of the vehicle body 11. The vertical positioning portion 63 has an engaging flange 64 formed at a distal end thereof. The vertical positioning portion 63 and the engaging flange 64 cooperate to define an outwardly extending tab portion of the second positioning part 61.

The engaging flange 64 has an inner surface spaced an interval δ12 away from the abutting surface 62 in the transverse outward direction of the vehicle body 11. The interval δ12 is slightly larger than a thickness th of the inner panel 72. The abutting surface 62 has a width W21. The vertical positioning portion 63 has a width W22 slightly larger than the width H22 of the second engagement hole 83b. The engaging flange 64 has a width W23 larger than the width W22 of the vertical positioning portion 63 and smaller than the width H21 (FIG. 4) of the second insertion hole 83a. The engaging flange 64 has a dimension set such that the engaging flange 64 can pass through the second insertion hole 83a. The projecting portion 82 of the inner panel 72 has a flat inner surface 82a disposed generally vertically, which may be referred to as a second flat inner surface. As seen from a comparison of FIGS. 4, 8A-8B and 10A-10B, in the assembled configuration of the apparatus, the first abutting surface 55 and the first flat inner surface 72a extend in a direction different from that of the second abutting surface 62 and the second flat inner surface 82a.

After the engaging flange 64 passes through the second insertion hole 83a, the cover 70 is moved in the direction shown by the arrow X, as shown in FIG. 4, thereby allowing the vertical positioning portion 63 to engage the second engagement hole 83b, as shown in FIG. 9 and FIG. 10B.

By the engagement between the vertical positioning portion 63 and the second engagement hole 83b, the cover 70 is positioned relative to the cover supporting member 40 without undergoing any vertical movement. Thus, without moving vertically, the cover 70 is positioned relative to the vehicle body 11 to which the cover supporting member 40 is secured. The vertical positioning portion 63 serves to position the cover 70 in such a manner as to prevent vertical movement of the cover 70.

The abutting surface 62 and the engaging flange 64 sandwich the inner panel 72 therebetween for positioning the cover 70 relative to the cover supporting member 40 to prevent the cover 70 from moving transversely of the vehicle body 11.

The arrangement of the sliding door apparatus 20, as discussed above, will be discussed below.

As shown in FIG. 2, FIG. 7 and FIG. 9, the sliding door apparatus 20 includes: the sliding door 13; the recessed part 21 formed on the side of the vehicle body 11 and extending in the front-and-rear direction of the vehicle body 11; the rail 30 attached to the recessed part 21 and extending in the front-and-rear direction of the vehicle body 11; the cover supporting member 40 attached directly to the side of the vehicle body 11 and continuously extending along the rail 30 within the recessed part 21; the cover 70 covering the outer sides of both the rail 30 and the cover supporting member 40; and the first and second positioning parts 51, 61 formed integrally with the cover supporting member 40 for positioning the inner surfaces 72a, 82a (FIG. 7 and FIG. 9) of the cover 70 relative to the cover supporting member 40.

The cover supporting member 40 is provided separately from the rail 30 and is attached directly to the vehicle body 11. Thus, the cover supporting member 40 is attached to the vehicle body 11 with accuracy unaffected by how accurately the rail 30 is attached to the vehicle body 11. Because the first and second positioning parts 51, 61 formed integrally with the cover supporting member 40 position the inner surfaces 72a, 82a of the cover 70, a position of the cover 70 relative to the vehicle body 11 can be precisely set.

The cover supporting member 40 extends continuously along the rail 30. Thus, the cover 70 can be positioned relative to the supporting member 40 with substantially uniform accuracy along the length of the cover 70.

Accordingly, the cover 70 can be positioned relative to the vehicle body 11 with improved accuracy. This enables an outer surface 71a of the outer panel 71 (that is, an outer surface 71a of the cover 70) to readily be disposed in flush with a side surface 11a of the vehicle 11. As a result, the vehicle 10 can provide improved outer appearance.

The first positioning parts 51 and the second positioning parts 61 are arranged longitudinally of the cover supporting member 40. The positioning parts can more accurately position the cover 70 than a single positioning part extending continuously along the length of the cover supporting member 40. The positioning parts are formed integrally with the cover supporting member with substantially uniform accuracy.

As shown in FIG. 5 and FIG. 7, the first positioning part 51 includes the engaging part 52 engaging the cover 70. By the engagement with the engaging part 52, the cover 70 can be more accurately positioned relative to the cover supporting member 40 as well as being more firmly attached to the cover supporting member 40.

As shown in FIG. 3, the cover 70 has at least one portion attached directly to the side of the vehicle body 11. With this arrangement, the cover 70 can be attached to the vehicle body 11 with improved accuracy.

As shown in FIG. 5 and FIG. 9, the second positioning parts 61 have the vertical positioning portions 63 positioning longitudinally opposite ends of the cover 70 in such a manner as to prevent any vertical movement of the cover 70. By virtue of the vertical positioning portions 63, the opposite ends of the elongated cover 70 can be accurately positioned relative to the cover supporting member 40 to prevent the cover 70 from moving or turning vertically.

As shown in FIG. 5 and FIG. 7, the first positioning parts 51 have the transverse positioning portions 54 positioning the cover 70 in such a manner as to prevent the cover 70 from moving transversely of the vehicle body 11. By virtue of the transverse positioning portions 54, the cover 70 can be more accurately positioned relative to the cover supporting member 40 without moving transversely of the vehicle body 11. Thus, the position of the cover 70 relative to the vehicle body 11 can be more accurately set.

The sliding door apparatus according to the present invention is suitable for a vehicle such as a car because the sliding door apparatus includes a sliding door, a guide rail provided on a side of a vehicle body of the vehicle for guiding the sliding door in a front-and-rear direction of the vehicle body between an opened position and a closed position, and a cover disposed outside the guide rail for covering the guide rail.

Obviously, various minor changes and modifications of the present invention are possible in the light of the above teaching. It is therefore to be understood that within the scope of the appended claims the invention may be practiced otherwise than as specifically described.

What is claimed is:

1. A sliding door apparatus for a vehicle, comprising:
   a sliding door;
   a recessed part formed on a side of a vehicle body of the vehicle and extending in a front-and-rear direction of the vehicle body;
   a guide rail attached to the recessed part for guiding the sliding door, the guide rail extending in the front-and-rear direction of the vehicle body, wherein a portion of the guide rail is disposed within the recessed part;
   a cover supporting member attached to the side of the vehicle body and extending substantially continuously along the portion of the guide rail disposed within the recessed part, said cover supporting member comprising an elongated base strip portion and a plurality of positioning parts attached to and integrally formed with said base strip portion,
   a cover covering the guide rail and the cover supporting member, wherein the cover comprises attachment structure corresponding to the respective positioning parts of the cover supporting member for cooperatively engaging the cover supporting member, and wherein said cover further comprises at least one portion attached directly to the side of the vehicle body; and
   wherein said positioning parts of the cover supporting member engage with said corresponding attachment structure on the cover, for positioning the cover relative to the cover supporting member.

2. A sliding door apparatus according to claim 1, wherein each of the positioning parts has engaging means for engaging the cover.

3. A sliding door apparatus according to claim 1, wherein at least one of the positioning parts has a vertical positioning portion for positioning longitudinally opposite ends of the cover in such a manner as to prevent vertical movement of the cover.

4. A sliding door apparatus according to claim 1, wherein at least one of the positioning parts has a transverse positioning portion for positioning the cover in such a manner as to prevent the cover from moving transversely of the vehicle body.

5. A sliding door apparatus according to claim 1, wherein said cover supporting member is formed of resin material.

6. A sliding door apparatus according to claim 1, wherein at least one of said positioning parts is different from at least one other of said positioning parts.

7. A sliding door apparatus according to claim 6, wherein at least one of said positioning parts has a vertical positioning portion which positions the cover in such a manner as to prevent vertical movement of the cover, and said at least one other of said positioning parts has a transverse positioning portion which positions the cover in such a manner as to prevent the cover from moving transversely of the vehicle body.

8. A sliding door apparatus according to claim 1, further including an attachment part also formed integrally with the cover supporting member for attaching the cover supporting member to the side of the vehicle body.

9. A sliding door apparatus according to claim 8, wherein said recessed part includes an attachment portion projecting therefrom and to which said attachment part is fastened.

10. A sliding door apparatus according to claim 1, wherein the corresponding attachment structure of said cover comprises a plurality of openings formed therein, and said plurality of positioning parts extend through said openings and operatively engage said cover.

11. A sliding door apparatus according to claim 1, wherein said cover includes inner and outer panels, said inner panel is attached to said cover supporting member and said outer panel extends substantially flush with the side of the vehicle body.

12. A sliding door apparatus for a vehicle, comprising:
   a sliding door;
   a recessed part formed on a side of a vehicle body of the vehicle and extending in a front-and-rear direction of the vehicle body;
   a guide rail attached to the recessed part for guiding the sliding door, the guide rail extending in the front-and-rear direction of the vehicle body;
   a cover supporting member attached directly to the side of the vehicle body and extending continuously along the guide rail within the recessed part;
   a cover covering the guide rail and the cover supporting member; and
   at least one positioning part formed integrally with the cover supporting member for positioning the cover relative to the cover supporting member;
   wherein said at least one positioning part comprises:
      a first positioning part having a distal end with a first flat abutting surface projecting in a transversely outward direction of the vehicle body, the first positioning part comprising a portion which is positioned on a first flat inner surface of the cover in an assembled configuration of the apparatus; and
      a second positioning part having a second abutting surface facing transversely outwardly of the vehicle body, the second positioning part comprising a portion which is positioned on a second flat inner surface of a projecting portion formed internally of the cover in the assembled configuration of the apparatus; and
      wherein in the assembled configuration of the apparatus, the first abutting surface and the first flat inner surface extend in a direction different from that of the second abutting surface and the second flat inner surface.

13. A sliding door apparatus for a vehicle, comprising:
   a sliding door;
   a recessed part formed on a side of a vehicle body of the vehicle and extending in a front-and-rear direction of the vehicle body;
   a guide rail attached to the recessed part of the vehicle body for guiding the sliding door, the guide rail extending in the front-and-rear direction of the vehicle body;

a cover supporting member attached to the side of the vehicle body and extending along the guide rail within the recessed part, the cover supporting member comprising a plurality of positioning parts for use in positioning the cover relative to the cover supporting member, each of said positioning parts comprising an outwardly extending tab portion; and a cover for placement covering the guide rail and the cover supporting member, said cover comprising an inner panel and an outer panel attached to the inner panel, wherein said inner panel has a plurality of openings formed therein corresponding to and fitting over the respective positioning parts of the cover supporting member.

14. A sliding door apparatus according to claim 13, wherein the positioning part has engaging means for engaging the cover.

15. A sliding door apparatus according to claim 13, wherein the positioning part has a vertical positioning portion for positioning longitudinally opposite ends of the cover in such a manner as to prevent vertical movement of the cover.

16. A sliding door apparatus according to claim 13, wherein the positioning part has a transverse positioning portion for positioning the cover in such a manner as to prevent the cover from moving transversely of the vehicle body.

17. A sliding door apparatus according to claim 13, wherein a first positioning part has a vertical positioning portion which positions the cover in such a manner as to resist vertical movement of the cover, and a second positioning part has a transverse positioning portion which positions the cover in such a manner as to substantially prevent the cover from moving transversely of the vehicle body.

18. The sliding door apparatus of claim 13, wherein said inner panel is attached to said cover supporting member, and wherein said outer panel extends substantially flush with the side of the vehicle body.

19. A sliding door apparatus according to claim 1, wherein each of said positioning parts of the cover supporting member comprises an outwardly extending tab, and wherein said corresponding attachment structure of said cover comprises a plurality of openings formed in said cover and respectively configured to receive the tabs of said positioning parts therein.

* * * * *